(12) United States Patent
Stewart et al.

(10) Patent No.: US 11,813,971 B2
(45) Date of Patent: Nov. 14, 2023

(54) TRAILER-MOUNTED CONVEYOR SYSTEM AND METHOD

(71) Applicant: Trout River Industries Inc., Coleman (CA)

(72) Inventors: Harvey Stewart, West Point (CA); Nico Den Hertog, Coleman (CA)

(73) Assignee: TROUT RIVER INDUSTRIES INC., Coleman (CA)

( * ) Notice: Subject to any disclaimer, the term of this patent is extended or adjusted under 35 U.S.C. 154(b) by 0 days.

(21) Appl. No.: 17/720,478

(22) Filed: Apr. 14, 2022

(65) Prior Publication Data

US 2022/0332238 A1 Oct. 20, 2022

Related U.S. Application Data

(60) Provisional application No. 63/201,166, filed on Apr. 15, 2021.

(51) Int. Cl.
| | |
|---|---|
| *B65G 15/60* | (2006.01) |
| *B60P 1/36* | (2006.01) |
| *B60P 1/60* | (2006.01) |
| *B65G 43/00* | (2006.01) |

(52) U.S. Cl.
CPC .............. *B60P 1/36* (2013.01); *B60P 1/60* (2013.01); *B65G 15/60* (2013.01); *B65G 43/00* (2013.01); *B65G 2203/0266* (2013.01)

(58) Field of Classification Search
None
See application file for complete search history.

(56) References Cited

U.S. PATENT DOCUMENTS

| | | | |
|---|---|---|---|
| 756,600 A | 4/1904 | Dodge | |
| 3,481,647 A * | 12/1969 | Cook | B60P 1/36 |
| | | | 414/528 |
| 3,498,482 A * | 3/1970 | Milburn | B60P 1/38 |
| | | | 414/510 |
| 3,593,864 A * | 7/1971 | Moser | B60P 1/38 |
| | | | 198/833 |
| 3,734,270 A | 5/1973 | Foody | |
| 3,756,380 A | 9/1973 | Ackroyd et al. | |
| 3,859,923 A | 1/1975 | Hamy | |
| 3,889,801 A | 6/1975 | Boyer | |
| 3,937,338 A * | 2/1976 | Cox | B60P 1/38 |
| | | | 198/300 |
| 4,068,769 A * | 1/1978 | Sweet | B65F 3/24 |
| | | | 116/28 R |

(Continued)

FOREIGN PATENT DOCUMENTS

FR 2679180 A1 * 1/1993 ............... B60P 1/38

*Primary Examiner* — Joseph A Dillon, Jr.
(74) *Attorney, Agent, or Firm* — BERESKIN & PARR LLP/S.E.N.C.R.L., s.r.l.

(57) ABSTRACT

A live-bottom trailer having a conveyor system. The conveyor system including: a frame; a conveyor mounted to the frame and having a carrying surface and an opposite rear surface, the conveyor operable to move the carrying surface between a first end of the live-bottom trailer and a second end of the live-bottom trailer while the rear surface passes over a support surface of the frame; and a pressurized air system operable to direct pressurized air at the rear surface of the conveyor to reduce friction between the support surface of the frame and the rear surface of the conveyor.

15 Claims, 3 Drawing Sheets

(56) References Cited

U.S. PATENT DOCUMENTS

| | | | | |
|---|---|---|---|---|
| 4,106,643 A | * | 8/1978 | McGehee | B60P 1/38 |
| | | | | 414/528 |
| 4,185,736 A | | 1/1980 | Jonkers | |
| 4,819,790 A | * | 4/1989 | Adcock | B65G 15/60 |
| | | | | 198/720 |
| 5,007,528 A | | 4/1991 | Hideharu | |
| 5,865,299 A | | 2/1999 | Williams | |
| 6,062,377 A | | 5/2000 | Mensch | |
| 6,186,732 B1 | | 2/2001 | Brown et al. | |
| 6,220,810 B1 | * | 4/2001 | Wilkerson | B60P 1/38 |
| | | | | 198/833 |
| 6,966,416 B2 | * | 11/2005 | Walker | B65G 47/261 |
| | | | | 414/535 |
| 6,971,508 B2 | | 12/2005 | Kotaki et al. | |
| 7,347,320 B2 | * | 3/2008 | Isaman | A01C 15/122 |
| | | | | 198/813 |
| 8,177,053 B2 | | 5/2012 | Hood et al. | |
| 9,169,072 B2 | * | 10/2015 | Wehner | B65G 23/06 |
| 10,781,047 B2 | | 9/2020 | Warmoth et al. | |
| 2004/0118661 A1 | | 6/2004 | Swinderman et al. | |
| 2006/0021858 A1 | | 2/2006 | Sherwood | |
| 2009/0110524 A1 | * | 4/2009 | Hoffmann | B60P 1/36 |
| | | | | 414/813 |
| 2020/0010006 A1 | * | 1/2020 | Wilson | B60P 1/36 |

* cited by examiner

TRAILER-MOUNTED CONVEYOR SYSTEM AND METHOD

CROSS REFERENCE TO RELATED APPLICATION

This application claims the benefit of U.S. Application No. 63/201,166 filed Apr. 15, 2021, the entire contents of which is incorporated herein by reference.

FIELD

The specification relates generally to a conveyor system, and more specifically to a trailer-mounted conveyor system.

BACKGROUND

United States Pat. App. Pub. No. 2004/0118661 to Swinderman et al. ("Swinderman") purports to disclose a multipressure plenum system for supporting a conveyor belt of a gas supported belt conveyor and a method of operation. Swinderman further purports to disclose that the multipressure plenum system includes a multipressure plenum having a support surface including a plurality of apertures and a chamber in fluid communication with the apertures. Swinderman purports to disclose that the chamber of the plenum is in selective fluid communication with a first source of gas at a first pressure, and is in selective fluid communication with a second source of gas at a second pressure. Swinderman purports to disclose that gas from the first source of gas at the first pressure flows through the apertures in the plenum to form a gas cushion which supports the conveyor belt above the plenum, and gas from the second source of gas at the second pressure selectively flows through the apertures in the plenum to provide additional support to the conveyor belt.

U.S. Pat. No. 10,781,047 to Warmoth et al. ("Warmoth") purports to disclose air-supported belt conveyors and independent conveyor subsystems that are selectively and independently designed to meet requirements that can change along the length of a conveyor, as well as from conveyor to conveyor.

U.S. Pat. No. 3,756,380 to Ackroyd et al. ("Ackroyd") purports to disclose a conveyor having an air cushion supported endless belt wherein the belt is pervious to enable air to pass through and provide secondary air cushions for supporting conveyed articles on the belt. Ackroyd purports to disclose that there is wall boundary means for containing the secondary air cushions, and that the air supply to the conveyor belt is by way of load responsive valves which open in the presence of a conveyed article. Ackroyd purports to disclose that dual air pressures enable articles to be hovered and manouvered above the belt whilst the conveyor is in operation.

SUMMARY

The following summary is intended to introduce the reader to various aspects of the applicant's teaching, but not to define any invention.

According to some aspects, there is provided a conveyor system mounted to a trailer, comprising: a frame; a conveyor mounted to the frame and having a carrying surface and an opposite rear surface, the conveyor operable to move the carrying surface between a first end of the trailer and a second end of the trailer while the rear surface passes over a support surface of the frame; a pressurized air system, including: an air supply portion configured to be coupled to a truck-based air supply of a truck to receive pressurized air from the truck-based air supply, and an air delivery portion fluidly joined to the air supply portion to receive the pressurized air from the truck-based air supply, the air delivery portion operable to direct the pressurized air at the rear surface of the conveyor to reduce friction between the support surface of the frame and the rear surface of the conveyor.

In some examples, the conveyor system includes a controller operable to sense a movement initiation force needed to initiate movement of the conveyor, and the controller is operable to turn on the air delivery portion to deliver pressurized air at the rear surface of the conveyor if the movement initiation force is greater than a threshold initiation force.

In some examples, the controller is operable to sense a movement maintaining force needed to maintain movement of the conveyor when the conveyor is moving, and the controller is operable to turn off the air delivery portion to cease delivering pressurized air at the rear surface of the conveyor if the movement maintaining force is less than a threshold maintaining force.

In some examples, the controller is operable to initiate movement of the carrying surface between the first end and the second end of the trailer while the air delivery portion is delivering pressurized air at the rear surface of the conveyor.

In some examples, the conveyor is an endless conveyor.

In some examples, the endless conveyor is an endless conveyor belt.

In some examples, the air delivery portion includes a plurality of air jet nozzles, the plurality of air jet nozzles spaced apart from one another.

In some examples, the truck-based air supply is an air compressor.

In some examples, the truck includes a brake system including a storage container and the air compressor.

In some examples, the air compressor is coupled to the storage container to supply the pressurized air to the storage container, and the air supply portion is configured to be coupled to the storage container to receive the pressurized air from the storage container.

In some examples, the trailer does not include an air compressor.

According to some aspects, there is provided a method of operating a conveyor system of a live-bottom trailer, comprising: joining a pressurized air system of the conveyor system to a truck-based air supply of a truck to receive pressurized air from the truck-based air supply; directing the pressurized air against an underside of a conveyor of the conveyor system, the underside being opposite a carrying surface; and moving the carrying surface between a first end of the trailer and a second end of the trailer while directing the pressurized air against the underside of the conveyor.

In some examples, the method further comprises sensing that a movement initiation force needed to initiate movement of the carrying surface is greater than a threshold initiation force, and directing the pressurized air against the underside of the conveyor in response to sensing that the movement initiation force is greater than the threshold initiation force.

In some examples, the method further comprises sensing that a movement maintaining force needed to maintain movement of the carrying surface when the carrying surface is moving is less than a threshold maintaining force, and ceasing, in response to sensing that the movement maintaining force is less than the threshold maintaining force, to direct the pressurized air against the underside of the conveyor while continuing to move the carrying surface between the first end of the trailer and the second end of the trailer.

In some examples, the truck-based air supply is a brake system of the truck, the brake system including a compressed air storage container, and joining the pressurized air system to the truck-based air supply includes joining the pressurized air system to the compressed air storage container to receive the pressurized air from the compressed air storage container.

According to some aspects, there is provided a live-bottom trailer having a conveyor system, the conveyor system comprising: a frame; a conveyor mounted to the frame and having a carrying surface and an opposite rear surface, the conveyor operable to move the carrying surface between a first end of the live-bottom trailer and a second end of the live-bottom trailer while the rear surface passes over a support surface of the frame; and a pressurized air system operable to direct pressurized air at the rear surface of the conveyor to reduce friction between the support surface of the frame and the rear surface of the conveyor.

In some examples, the pressurized air system includes: an air supply portion configured to be coupled to a truck-based air supply of a truck to receive the pressurized air from the truck-based air supply, and an air delivery portion fluidly joined to the air supply portion to receive the pressurized air from the truck-based air supply, the air delivery portion operable to direct the pressurized air at the rear surface of the conveyor to reduce friction between the support surface of the frame and the rear surface of the conveyor.

In some examples, the conveyor system includes a controller, the controller operable to: sense a movement initiation force needed to initiate movement of the conveyor; turn on the air delivery portion to deliver pressurized air at the rear surface of the conveyor if the movement initiation force is greater than a threshold initiation force; sense a movement maintaining force needed to maintain movement of the conveyor when the conveyor is moving; turn off the air delivery portion to cease delivering pressurized air at the rear surface of the conveyor if the movement maintaining force is less than a threshold maintaining force; and initiate movement of the carrying surface between the first end and the second end of the trailer while the air delivery portion is delivering pressurized air at the rear surface of the conveyor.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Figure 1:
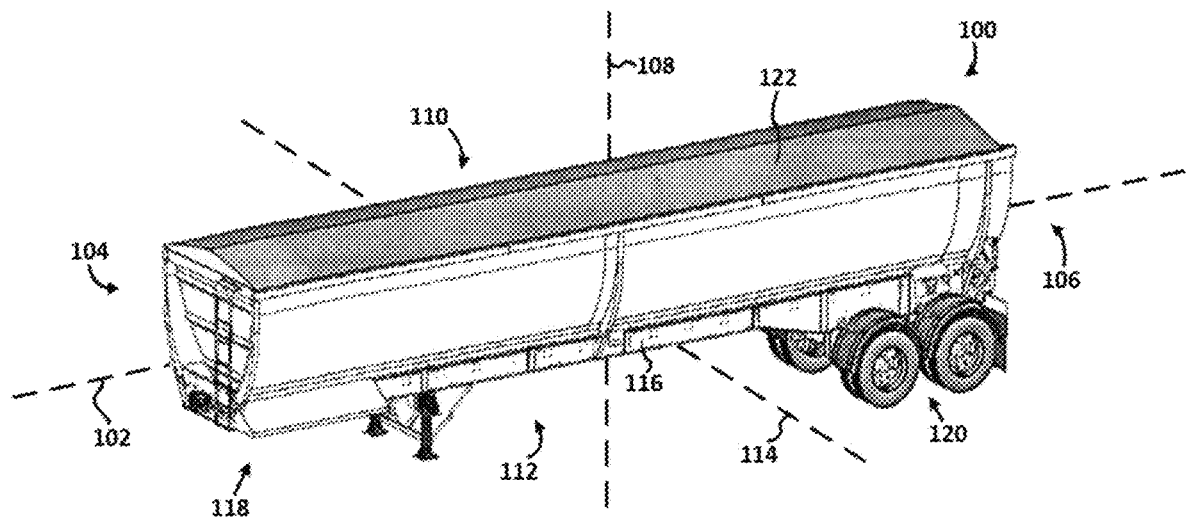
FIG. 1 is a perspective view of a trailer.

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses or process described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim, or dedicate to the public any such invention by its disclosure in this document.

Although method steps may be described (in the disclosure and/or in the claims) in a sequential order, such methods may be configured to work in alternate orders. In other words, any sequence or order of steps that may be described does not necessarily indicate a requirement that the steps be performed in that order. The steps of methods described herein may be performed in any order that is practical. Further, some steps may be performed simultaneously.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the examples described herein may be practiced without these specific details. In other instances, well-known methods, procedures, and components have not been described in detail so as not to obscure the examples described herein.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Referring to FIG. 1, illustrated is a trailer 100 (e.g., a semi-trailer). The trailer 100 includes a longitudinal axis 102 extending between a first or front end 104 and a second or rear end 106. Trailer 100 includes a vertical axis 108 extending between a top or upper end 110 and a bottom or lower end 112, the vertical axis 108 is perpendicular to the longitudinal axis 102. Trailer 100 also includes a lateral axis 114 that is perpendicular to each of the longitudinal axis 102 and the vertical axis 108.

In some examples, trailer 100 includes a frame or chassis 116 extending from the front end 104 to the rear end 106 with a hitching system 118 at the front end 104. In some examples, rear end 106 of the trailer 100 may be openable (e.g., the rear end 106 may include an openable gate or door). The trailer 100 may include a wheel or drive system 120 at the lower end 112. In some examples, the trailer 100 is open at the top end 110 (e.g., closed by a tarp or other removeable and flexible cover 122).

Figure 2:
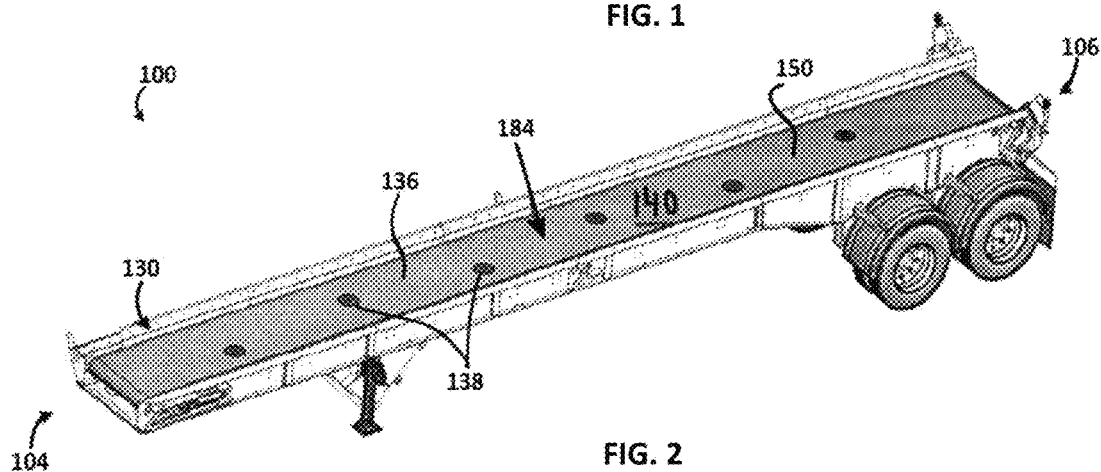
FIG. 2 is a first perspective cut away view of a lower end of the trailer of FIG. 1.
Figure 3:
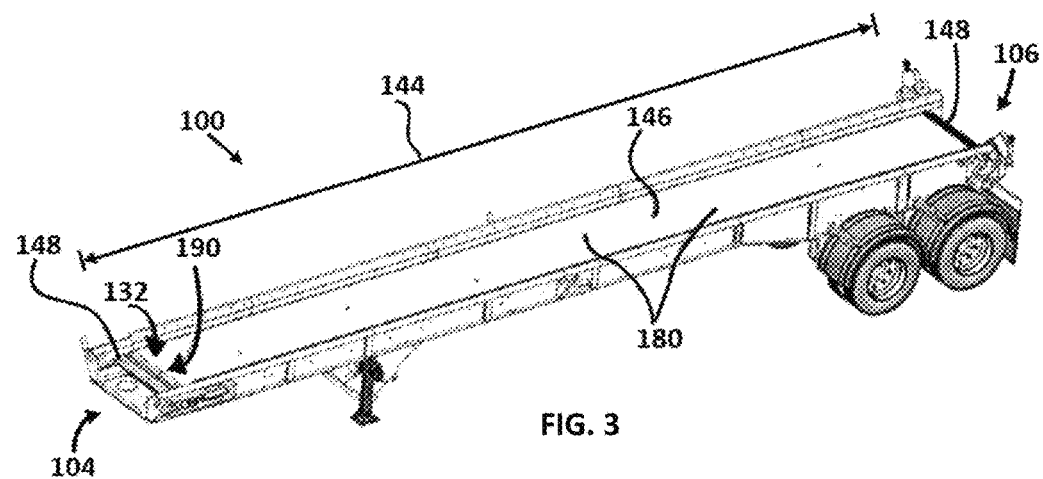
FIG. 3 is a second perspective cut away view of the lower end of FIG. 2.

Referring now to FIGS. 2 and 3, in some examples the trailer 100 includes a conveyor system 130. For example, the trailer 100 may be a live bottom trailer 100 with a conveyor system 130 to, e.g., carry granular material to the rear end 106 of the trailer 100.

The conveyor system 130 includes a frame 132 (e.g., with conveyor frame 132 mounted to trailer frame 116) and a conveyor 136 mounted to the frame 132. The conveyor includes a carrying surface 140 and an opposite rear or back surface 142.

In some examples, the conveyor system 130 (e.g., an endless conveyor belt, a moving floor, and/or a moving end wall) is operable to move the carrying surface 140 between the first end 104 and the second end 106, while the rear surface 142 passes over a support surface 146 of the frame 116 (e.g., the rear surface 142 passes directly over the support surface 146 or within 10 cm, 5 cm, or 1 cm thereof). The support surface 146 may be an upper surface of a support plate, and may be, e.g., a planar surface and/or horizontally extending). The support surface may be provided to, e.g., support the conveyor 136 when a load is resting and/or dropped on the conveyor 136 (e.g., the conveyor 136 may press down against the support surface to spread the force of the weight and/or momentum of the load).

The conveyor 136 may be an endless conveyor 136, such as a conveyor belt 136 (e.g., an endless conveyor belt extending between pulleys 148). The belt 136 may be a flexible material. In some examples, the conveyor 136 is a light weight conveyor. For example, the conveyor may be a reduced strength conveyor belt (e.g., less than 400, less than 350, or less than 300 strength per inch and/or at least 10% less than standard strength per inch, such as less than 387 strength per inch if the regular belt has a 430 strength per inch). For example, a regular belt may be a 430 strength per inch belt and the conveyor 136 may be a 320 strength per inch friction bareback belt, which may reduce the weight by, e.g., 300 lbs. A lighter weight conveyor may increase the amount of payload the trailer 100 is able to carry.

In some examples, the conveyor system 130 may include a reduced-size pulley 148. For example, the conveyor system 130 may include a head pulley that is less than 20 inches, less than 18 inches or less than 16 inches and/or more than 10% smaller than a standard head pulley. For example, the conveyor system 130 may have a 14" head pulley, which may reduce the weight of the conveyor system by, e.g., 500 lb.

Figure 4:
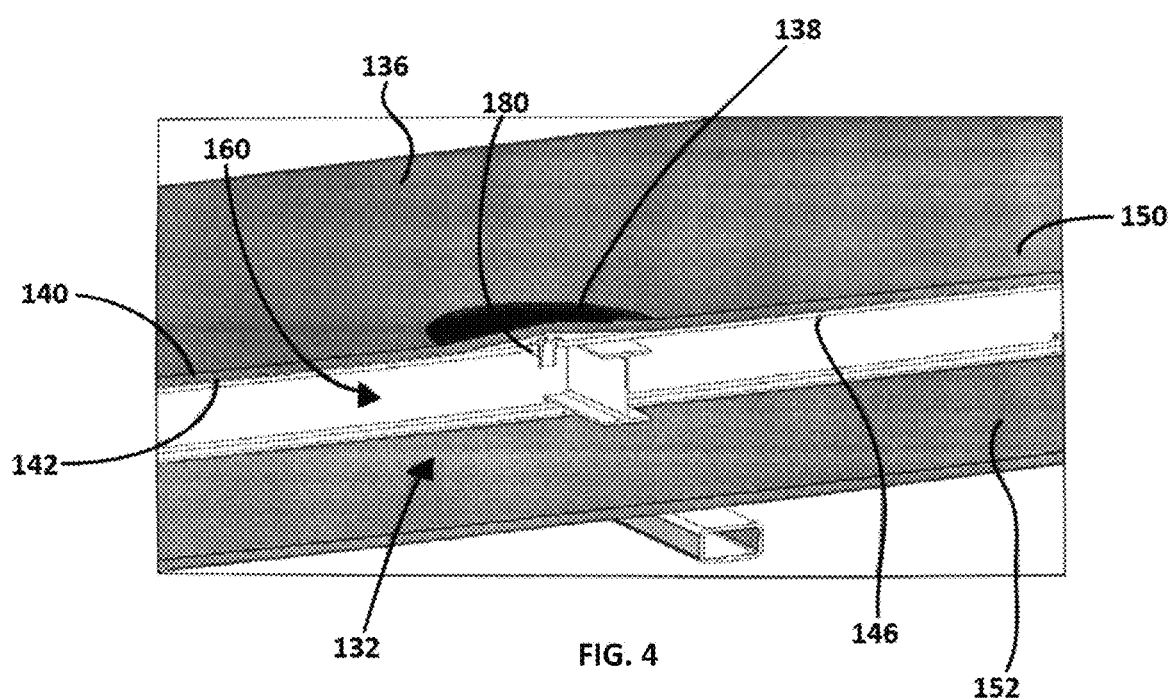
FIG. 4 is a perspective cross-sectional view of a portion of the lower end of FIG. 2.
Figure 5:
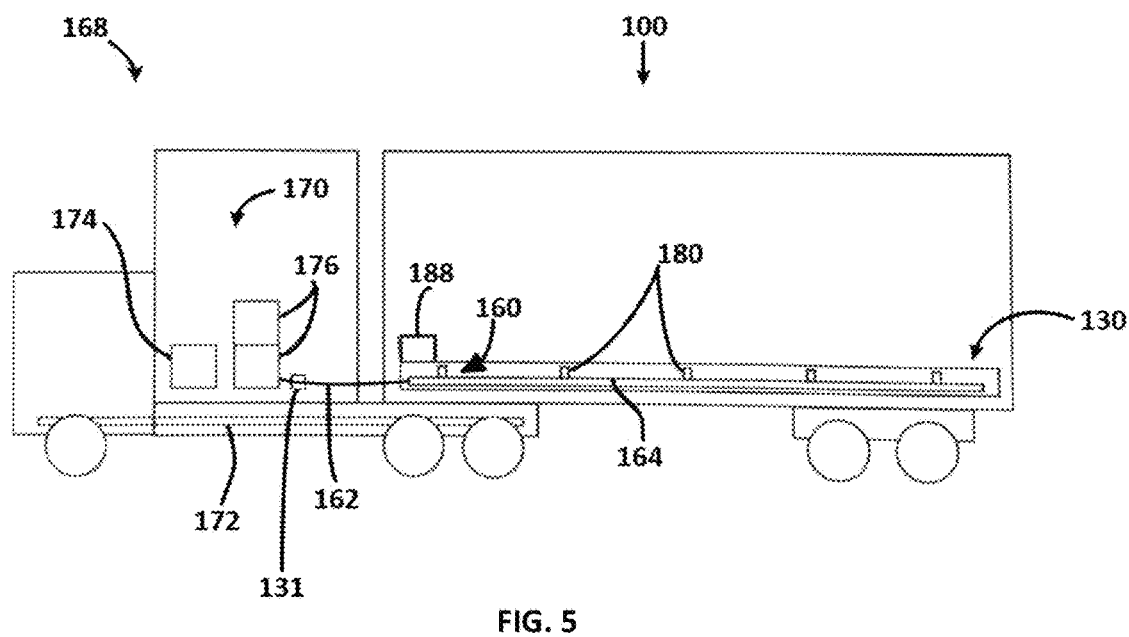
FIG. 5 is a schematic diagram of a truck and trailer.

Referring now to FIG. 4, the conveyor 136 may include an upper run 150 above the support surface 146 and a lower or return run 152 beneath the support surface 146. The carrying surface 140 may be an upper surface of the upper run 150, and the rear or underside surface 142 may be a lower surface of the upper run 150.

Referring now to FIGS. 2 to 5, the conveyor system 130 includes a pressurized air system 160. The pressurized air system 160 is operable to direct pressurized air at the rear surface 142 of the conveyor 136. For example, the pressurized air system 160 may be operable to direct compressed air between the rear surface 142 and the support surface 146 to, e.g., reduce friction between the support surface 146 of the frame 116 and the rear surface 142 of the conveyor 136. In some examples, the pressurized air system 160 includes an air supply portion 162 and an air delivery portion 164.

The air supply portion 162 is configured to be coupled to a truck-based air supply of a truck 168 (i.e., a tractor unit) to receive pressurized air from the truck-based air supply 170. For example, the air supply portion 162 may include a hose and a coupling to join the hose to the truck-based air supply. The truck-based air supply 170 may be, e.g., a brake system 172 of the truck 168. For example, the brake system 172 may include an air compressor 174, and the air supply portion 162 may be coupled to the air compressor 174 to receive compressed air. The air supply portion 162 may be joined to the air compressor 174 indirectly, such as via a storage tank 176. The air compressor 174 may supply compressed air to the storage tank 176 and the air supply portion 162 may be coupled (e.g., directly) to the storage tank 176 to receive compressed air from the storage tank 176. In some examples, the trailer 100 does not include an air compressor (e.g., to reduce the weight of the trailer 100).

In some examples, the air supply portion 162 is only coupled directly to the storage tank 176 and can only use the air in the storage tank 176 (i.e., the air supply portion 162 may not be connected directly to the air compressor 174 to receive an unlimited supply of compressed air). For example, the conveyor system 130 may be limited to the use of the amount of air in the storage tank 176, or a portion thereof as set by regulations governing how much compressed air reserve must be maintained in the tank 176, and would need the storage tank 176 to be replenished (e.g., by operation of the truck 168) before more air could be received. In some examples, the conveyor system 130 is configured to be limited to receiving a portion of the compressed air in the storage tank 176 (e.g., leaving at least 5, 10, 25, 50, 75, 80, 90, or 95 percent of the capacity of the tank capacity of the truck 168 that is available for use by the truck's systems, such as the brake system).

In some examples, the storage tank 176 may hold more than 50, more than 60 or about 80 liters of compressed air (e.g., at between 50 and 100 or about 75 PSI), and the conveyor system 130 may take at least 20, at least 30, at least 40 or about 50 liters of compressed air to unload a load from the trailer 100. The conveyor system 130 may have a pressure protection system 131 to limit the amount of compressed air being taken from the truck 168 to ensure that truck brakes always have enough air.

The air delivery portion 164 is fluidly joined to the air supply portion 162 to receive the pressurized air therefrom. The air delivery portion 164 is operable to direct the pressurized air at the rear surface 142 of the conveyor 136 to, e.g., reduce friction between the support surface 146 of the frame 116 and the rear surface 142 of the conveyor 136. For example, the air delivery portion 164 may include a nozzle 180 (e.g., fluidly joined to a manifold to which a hose of the air supply portion 162 supplies compressed air) that is selectively openable to direct air at the rear surface 142 of the conveyor 136 (e.g., at a central portion 184 of the conveyor 136, such as within the central 50 percent of the width or the central 30 percent of the width, rather than adjacent a lateral edge). In some examples, the conveyor system 130 includes a plurality of nozzles 180 arranged in a spaced-apart arrangement along the length of the support surface 146 (e.g., two or more nozzles 180 evenly spaced along the length 144). In some examples, directing the compressed air against the belt 136 forms raised pocket structures 138 between the belt and the support surface (e.g., the pockets 138 may form a lifted underside that is at least 1 mm, 10 mm, or 100 mm further from the support surface 146 than the surrounding underside 142 of the conveyor 136).

In some examples, the conveyor system 130 also includes a controller 188. The controller 188 is operable to sense a movement initiation force needed to initiate movement of the conveyor 136 (e.g., to begin movement from a dead stop), such as 300, 400, or 500 PSI measured from a hydraulic motor which drives the belt (e.g., if the force needed is about 500 PSI or greater the compressed air is used). For example, the conveyor 136 may be driven by a drive system 190 (e.g., a driven end pulley 148), and the controller 188 may receive an input from the drive system 190 indicative of the force needed to initiate movement of the conveyor 136.

The controller 188 is operable to turn on the air delivery portion 164 to deliver pressurized air at the rear surface 142 of the conveyor if the movement initiation force is greater than a threshold initiation force. This may reduce friction between the conveyor 136 and the support surface 146 (i.e., by providing a lifting force against the conveyor 136), which may reduce the force needed to move the conveyor 136 and/or reduce the strain on the conveyor 136 (i.e., to prevent the conveyor 136 from breaking). The controller 188 may be operable to initiate movement of the carrying surface 140 between the first end 104 and the second end 106 of the trailer 100 (e.g., such that the carrying surface 140 moves part or all of the way from the first end to the second end or vice versa) while the air delivery portion 164 is delivering pressurized air at the rear surface 142 of the conveyor 136.

In some examples, air is shut off once the conveyor 136 is moving (e.g., the controller 188 may receive an output from the drive system 190 indicating that the conveyor 136 is moving). This may reduce the amount of air used, which may keep the system from needing more compressed air than is available, since the amount of air available may be limited to all or a portion of the air stored in the storage tank 176. Additionally or alternatively, the controller 188 may be operable to sense a movement maintaining force needed to maintain movement of the conveyor 136 when the conveyor 136 is moving (e.g., the controller 188 may receive an output from the drive system 190 when the conveyor 136 is moving indicating the force needed to keep it moving) and may be operable to turn off the air delivery portion 164 to cease delivering pressurized air at the rear surface 142 of the conveyor 136 if the movement maintaining force is less than a threshold maintaining force (which may be, e.g., as soon as the conveyor 136 is moving or after a portion of a load is no longer on the conveyor 136).

Figure 6:
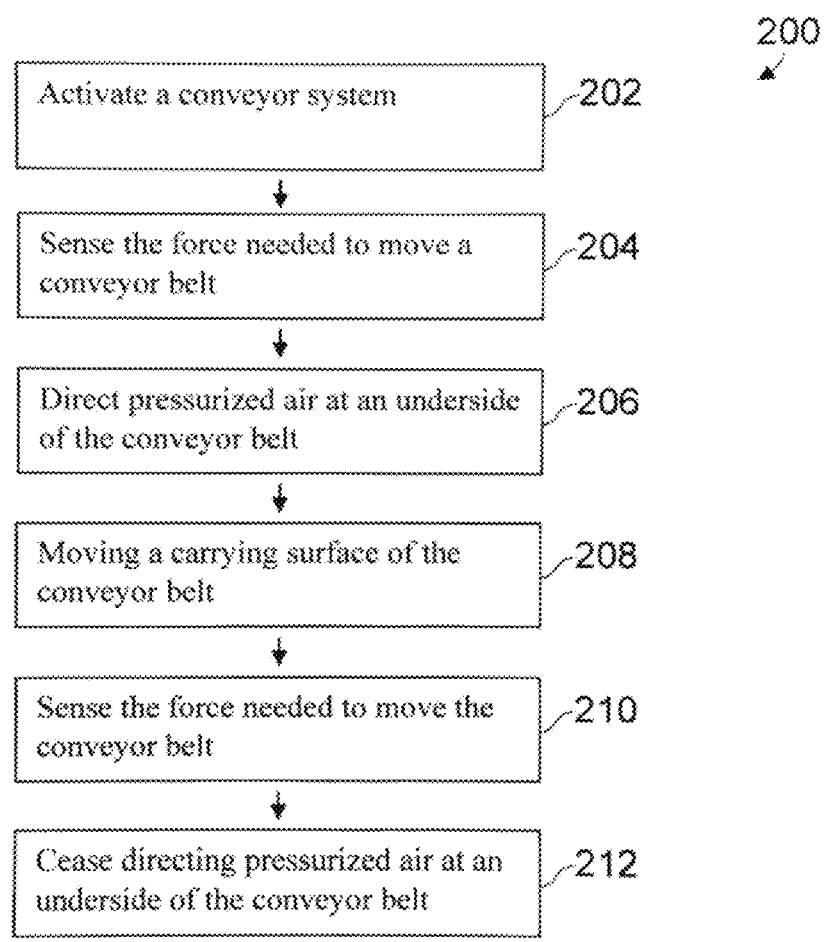
FIG. 6 is a flow diagram of a method of operating a conveyor system of a trailer.

Referring now to FIG. 6, illustrated is a method 200 of operating the conveyor system 130 (e.g., the conveyor system 130 of a live-bottom trailer). The method 200 includes, at step 202, joining the pressurized air system 160 of the conveyor system 130 to the truck-based air supply 170 of the truck 168 to receive pressurized air from the truck-based air supply 170. For example, an operator may run a hose of the pressurized air system 160 from the trailer 100 to the truck 168, and join the hose to the storage container 176 of the truck 168 (e.g., the storage container of the brake system of the truck 168) via a coupling on a distal end of the hose.

Method 200 also includes, at step 206, directing the pressurized air against the underside 142 of the conveyor 136 of the conveyor system 130. For example, the operator may actuate a controller to open valves of the pressurized air system 160 to release the compressed air, and the pressurized air system 160 may direct the air against the underside 142 of the upper run 150 of the conveyor 136 (e.g., via nozzles 180).

In some examples, pressurized air may be used whenever the conveyer system 130 is activated (e.g., compressed air may be used in all cases when starting the conveyor 136 movement and/or when running the conveyor 136). However, in some examples, the method 200 includes, at step 204, sensing that a movement initiation force needed to initiate movement of the carrying surface 140 is greater than a threshold initiation force, and proceeding with step 206 in response. Using compressed air only when the force needed to move the conveyor 136 is above a threshold may allow for a reduced use of air compared to using pressurized air continually and/or in response to non-sensed conditions.

Method 200 also includes, at step 208, moving the carrying surface 140 between the first end 104 of the trailer 100 and the second end 106 of the trailer 100 while directing the pressurized air against the underside 142 of the conveyor 136 (i.e., to reduce the force needed to move the carrying surface). For example, the controller may turn on the drive system 190 of the conveyor system 130 to begin the motion of the conveyor 136 (e.g., with the upper run 150 moving towards the front end 104 or with the upper run 150 moving towards the rear end 106), and the drive system 190 and the pressurized air system 160 may operate at the same time. This may allow for a lighter conveyor 136 (e.g., a thinner belt, a belt made of weaker material, and/or a belt without a chain loop) to be used (e.g., used without breaking or excessive wear) compared to running (e.g., operating and/or initiating) the drive system 190 without running the pressurized air system 160.

In some examples, the method 200 includes stopping the pressurized air once the carrying surface 140 is moving (e.g., in response to sensing that the carrying surface 140 is moving and/or within 30, 10, 5, or 1 seconds of the beginning of motion of the carrying surface 140 relative to the support surface 146). Alternatively, the method 200 may include, at step 210 sensing that the movement maintaining force needed to maintain movement of the carrying surface 140 when the carrying surface 140 is moving is less than a threshold maintaining force. The method 200 may also include, at step 212 and in response to step 210, ceasing to direct the pressurized air against the underside 142 of the conveyor 136 while continuing to move the carrying surface 140 between the first end 104 of the trailer 100 and the second end 106 of the trailer 100. For example, the method 200 may include directing pressurized air at the underside while starting (e.g., within 10, 5, or 1 second of starting) the movement of the conveyor, and then shutting off the pressurized air once the conveyor is moving (e.g., at a predetermined speed).

The present invention has been described here by way of example only. Various modification and variations may be made to these exemplary embodiments without departing from the scope of the invention, which is limited only by the appended claims.

The invention claimed is:

1. A conveyor system mounted to a trailer, comprising:
   a. a frame;
   b. a conveyor mounted to the frame and having a carrying surface and an opposite rear surface, the conveyor operable to move the carrying surface between a first end of the trailer and a second end of the trailer while the rear surface passes over a support surface of the frame;
   c. a pressurized air system, including:
      i. an air supply portion configured to be coupled to a truck-based air supply of a truck to receive pressurized air from the truck-based air supply, and
      ii. an air delivery portion fluidly joined to the air supply portion to receive the pressurized air from the truck-based air supply, the air delivery portion operable to direct the pressurized air at the rear surface of the conveyor to reduce friction between the support surface of the frame and the rear surface of the conveyor; and
   d. a controller operable to sense a movement initiation force needed to initiate movement of the conveyor, and the controller is operable to turn on the air delivery portion to deliver pressurized air at the rear surface of the conveyor if the movement initiation force is greater than a threshold initiation force.

2. The conveyor system of claim 1, wherein the controller is operable to sense a movement maintaining force needed to maintain movement of the conveyor when the conveyor is moving, and the controller is operable to turn off the air delivery portion to cease delivering pressurized air at the rear surface of the conveyor if the movement maintaining force is less than a threshold maintaining force.

3. The conveyor system of claim 1, wherein the controller is operable to initiate movement of the carrying surface between the first end and the second end of the trailer while the air delivery portion is delivering pressurized air at the rear surface of the conveyor.

4. The conveyor system of claim 1, wherein the conveyor is an endless conveyor.

5. The conveyor system of claim 4, wherein the endless conveyor is an endless conveyor belt.

6. The conveyor system of claim 1, wherein the air delivery portion includes a plurality of air jet nozzles, the plurality of air jet nozzles spaced apart from one another.

7. The conveyor system of claim 1, wherein the truck-based air supply is an air compressor.

8. The conveyor system of claim 7, wherein the truck includes a brake system including a storage container and the air compressor.

9. The conveyor system of claim 8, wherein the air compressor is coupled to the storage container to supply the pressurized air to the storage container, and the air supply portion is configured to be coupled to the storage container to receive the pressurized air from the storage container.

10. The trailer comprising the conveyor system of claim 1, wherein the trailer does not include an air compressor.

11. A method of operating a conveyor system of a live-bottom trailer, comprising:
    a. joining a pressurized air system of the conveyor system to a truck-based air supply of a truck to receive pressurized air from the truck-based air supply;
    b. directing the pressurized air against an underside of a conveyor of the conveyor system, the underside being opposite a carrying surface; and
    c. moving the carrying surface between a first end of the trailer and a second end of the trailer while directing the pressurized air against the underside of the conveyor; and
    d. sensing that a movement initiation force needed to initiate movement of the carrying surface is greater than a threshold initiation force, and directing the pressurized air against the underside of the conveyor in response to sensing that the movement initiation force is greater than the threshold initiation force.

12. The method of claim 11, further comprising:
    a. sensing that a movement maintaining force needed to maintain movement of the carrying surface when the carrying surface is moving is less than a threshold maintaining force, and
    b. ceasing, in response to sensing that the movement maintaining force is less than the threshold maintaining force, to direct the pressurized air against the underside of the conveyor while continuing to move the carrying surface between the first end of the trailer and the second end of the trailer.

13. The method of claim 11, wherein the truck-based air supply is a brake system of the truck, the brake system including a compressed air storage container, and joining the pressurized air system to the truck-based air supply includes joining the pressurized air system to the compressed air storage container to receive the pressurized air from the compressed air storage container.

14. A live-bottom trailer having a conveyor system, the conveyor system comprising:
    a. a frame;
    b. a conveyor mounted to the frame and having a carrying surface and an opposite rear surface, the conveyor operable to move the carrying surface between a first end of the live-bottom trailer and a second end of the live-bottom trailer while the rear surface passes over a support surface of the frame; and
    c. a pressurized air system operable to direct pressurized air at the rear surface of the conveyor to reduce friction between the support surface of the frame and the rear surface of the conveyor; and
    d. a controller, the controller operable to:
        i. sense a movement initiation force needed to initiate movement of the conveyor;
        ii. turn on the air delivery portion to deliver pressurized air at the rear surface of the conveyor if the movement initiation force is greater than a threshold initiation force;
        iii. sense a movement maintaining force needed to maintain movement of the conveyor when the conveyor is moving;
        iv. turn off the air delivery portion to cease delivering pressurized air at the rear surface of the conveyor if the movement maintaining force is less than a threshold maintaining force; and
        v. initiate movement of the carrying surface between the first end and the second end of the trailer while the air delivery portion is delivering pressurized air at the rear surface of the conveyor.

15. The live-bottom trailer of claim 14, wherein the pressurized air system includes:
    a. an air supply portion configured to be coupled to a truck-based air supply of a truck to receive the pressurized air from the truck-based air supply, and
    b. an air delivery portion fluidly joined to the air supply portion to receive the pressurized air from the truck-based air supply, the air delivery portion operable to direct the pressurized air at the rear surface of the conveyor to reduce friction between the support surface of the frame and the rear surface of the conveyor.

* * * * *